United States Patent
Kim et al.

[11] Patent Number: 6,064,133
[45] Date of Patent: May 16, 2000

[54] BUILT-IN STATOR OF STAR-WINDING MECHANISM AND METHOD OF PRODUCING THE STATOR AND BLDC MOTOR USING THE SAME

[75] Inventors: Byungkyu Kim; Joon Kim, both of Seoul, Rep. of Korea

[73] Assignees: Yuyu Co., Ltd., Seoul; Amotron Co., Ltd., Kyungki-do, both of Rep. of Korea

[21] Appl. No.: 09/024,061

[22] Filed: Feb. 17, 1998

[30] Foreign Application Priority Data

Feb. 17, 1997 [KR] Rep. of Korea .......................... 97-4701

[51] Int. Cl.[7] .............................. H02K 1/12; H02K 1/22; H02K 11/00
[52] U.S. Cl. ......................... 310/254; 310/268; 310/68 B
[58] Field of Search ..................................... 310/43, 67 R, 310/688, 268, 254; 318/138, 254

[56] References Cited

U.S. PATENT DOCUMENTS

| | | | |
|---|---|---|---|
| Re. 31,278 | 6/1983 | Schmider | 310/268 |
| 3,375,386 | 3/1968 | Hayner et al. | 310/268 |
| 4,093,897 | 6/1978 | Fujita et al. | 310/268 |
| 4,242,608 | 12/1980 | Ishigaki et al. | 310/68 R |
| 4,260,920 | 4/1981 | Nakamura et al. | 310/268 |
| 4,324,994 | 4/1982 | Hager | 310/68 R |
| 4,902,923 | 2/1990 | Okauchi | 310/268 |

FOREIGN PATENT DOCUMENTS

| | | |
|---|---|---|
| 96-976 | 1/1996 | Rep. of Korea . |
| 96-977 | 1/1996 | Rep. of Korea . |
| 96-18767 | 5/1996 | Rep. of Korea . |

*Primary Examiner*—Clayton LaBelle
*Attorney, Agent, or Firm*—McDermott, Will & Emery

[57] ABSTRACT

A stator assembly operated in a 2-phase drive manner including first and second stator coils wound in a star shape with a plurality of projections and a plurality of grooves, and arranged with a predetermined phase difference; and an annular supporting body into which the first and second stator coils are inserted for supporting the coils, insulating them from each other. Each stator coil includes four projections and four grooves, and there is a phase difference $\theta$ between the first and second stator coils, the difference determined by the following equation: $\theta = 360/2P \pm 360/P$, wherein P denotes the number of a rotor's magnetic poles. A brushless direct-current motor operated in a 2-phase drive manner includes a stator having first and second stator coils wound in a star shape with a plurality of projections and a plurality of grooves, and arranged with a predetermined phase difference; a shaft rotatably supported on a case; at least one disk-shaped multi-pole rotor supported by the shaft with an air gap from the stator in an axial direction; first and second location sensors provided to the stator with the same phase difference as that of the first and second stator coils for detecting the rotor's magnetic pole; and a driving control circuit driving the first and second stator coils in response to the detection of the magnetic pole of the rotor by the first and second location sensors, wherein said phase difference is determined by the equation: $\theta = 360/2P \pm 360/P$ (P=the number of a rotor's magnetic poles).

8 Claims, 9 Drawing Sheets

BUILT-IN STATOR OF STAR-WINDING MECHANISM AND METHOD OF PRODUCING THE STATOR AND BLDC MOTOR USING THE SAME

BACKGROUND OF THE INVENTION

1. Field of the Invention

The present invention relates to a built-in stator, a method of manufacturing the same, and a brushless direct-current ("BLDC") motor using such a stator. More particularly, it relates to a built-in stator having two coils wound in a star shape and operated in a 2-phase drive manner thereby assuring a simple structure and precluding torque ripple and loss of coil, and a BLDC motor employing the stator.

2. Description of the Related Art

Coreless-type BLDC motors may be classified into cylindrical core (radial) and coreless (axial) ones depending on whether a stator core exists.

The core-type BLDC motors are characterized as an internal magnet-type motor and an external magnet-type motor. The internal magnet-type motor includes a cylindrical coil-wound stator and a rotor of cylindrical permanent magnets provided to a plurality of protrusions formed on its inner circumference so as to be of electromagnetic construction. In the external magnet-type motor, a stator around which a coil is wound and a rotor having cylindrical permanent magnets are provided to a plurality of protrusions formed on its outer circumference.

Since its magnetic circuit has an axial-symmetric structure, the core BLDC motor makes little noise during operation and is suitable for low-speed rotation, creating desirable torque. This core BLDC motor, however, results in a waste of materials for making a stator and requires great expense for facility investment for mass production. In addition, since the core BLDC motor's stator and rotor are of complicated structure, it is not easy to make the motor compact, and it cannot assure high efficiency and creates undesirable torque.

A coreless BLDC motor was proposed in order to solve the above-described problems. Referring to the conventional coreless BLDC motor, rotors that each consist of an annular magnet and a yoke are fixed to a shaft, and stators around with a plurality of stator coils wound therearound are fixed to a casing. One end of the shaft is rotatably joined to the casing by means of a pair of bearings.

This coreless BLDC motor has a magnetic circuit axially created between the rotors consisting of a set of N-and-S pole magnets and the stators about which a plurality of the stator coils generating electromagnetic force are wound. Thus, even if a buffer spring is inserted between a pair of the bearings, the coreless BLDC motor generates great axial vibrations due to the stators' attracting or repelling force. Besides, the axial vibrations induce a resonance of the overall system employing the coreless BLDC motor during operation, thereby increasing the noise. Accordingly, the motor's efficiency is not decreased during high-speed rotation but gives rise to much noise.

In conclusion, the above-described coreless BLDC motor saves materials and has an advantageous yield aspect compared to the core BLDC motor. Moreover, it is possible to make it compact, which lowers the overall production costs and enhances its efficiency. The coreless BLDC motor, however, creates much noise due to axial vibrations during operation.

Korean Patent Application Nos. 96-976 and 96-977 filed on Jan. 18, 1996 by this applicant have proposed a double rotor/double stator-type coreless brushless direct-current (BLDC) motor which counteracts axial vibrations created during operation, and makes torque double or more.

The coreless-type blushless direct-current motor of a double rotor-type disclosed in Korean Patent Application No. 96-977 includes first and second disk-shaped rotors each having a plurality of north-polar magnets and south-polar magnets, said first and second rotors being disposed opposing to each other such that the corresponding magnets have an opposite polarity to each other; a rotating shaft connected to a central portion of the rotors through a bushing; left and right cases rotatably supporting opposite ends of the rotating shaft; and first and second stators each having a plurality of bobbinless stator coils for applying electromagnetic force to the first and second rotors in an opposite direction to each other, the first and second stators being mounted between the first and second rotors at a predetermined clearance.

In the above application a plurality of stator coils each wound around the middle of the first and second double rotors are of double-stator type structure, thus forming a magnetic circuit of symmetric structure with respect to stator and rotor shafts. The attracting force or repelling force of the same intensity is applied to the stator coils of the first and second stators in an opposite direction to each other, so the attracting force counteracts the repelling force thus minimizing an axial vibration acting on the first and second rotors.

The symmetric structure of the double/stator type coreless BLDC motor has a single body made by insert molding, and Korean Patent Application No. 96-18767 (filed on May 30, 1996) proposes this motor for enhancing the durability and reducing the production costs.

The BLDC motor, as shown in FIG. 1, includes upper and lower cases 71A and 71B defining a cylindrical case with a stator assembly 51 having an outer circumference 67 extending upward and downward and coupled between the upper and lower cases 71A and 71B.

Upper and lower rotors 73A and 73B each having a magnet dividing multi-polarity arrangement structure are fixedly coupled around the rotating shaft 77 through bushings 75A and 75B at upper and lower portions of the stator assembly 51.

The respective rotors 73A and 73B have eight magnets 81A and 81B. That is, four disk-type N-polar magnets and four disk-type S-polar magnets are alternately supported on a support 79 integrally formed with the bushings 75A and 75B and made of a polyethylene telephtalate or polybuthylene telephtalate, and, on its one side, annular-shaped magnetic yokes 83A and 83B are integrally attached, thereby forming a magnetic circuit with respect to the eight magnets 81.

The arrangement of the magnets 81A and 81B and the coils 55 of the stator assembly 51 is illustrated in FIG. 11. The oblique lined annular-shaped magnets 81A and 81B are disposed corresponding to the penetrating holes 65 of the coils 55.

An auxiliarly magnet 85 for detecting the location of the hole terminal is attached on the upper surface of the yoke 83A of the upper rotor 73A. The auxiliarly magnet 85 is disposed opposing to the hole terminal 89 of the printed circuit board 87 mounted on an inner circumference of the upper case 71A. An arm connector 91 to which the upper terminal 63A of the stator assembly 51 is press-coupled is mounted on one side of the control printed circuit board 87.

Upper and lower bearings 93A and 93B are fixed on central concave portions of the upper and lower cases 71A and 71B, respectively. The rotating shaft 77 of the rotors 73A and 73B is rotatably supported through the bearings 93A and 93B.

Reference numerals 95 and 97 denote a distance maintaining bushing and a screw for fixing the upper and lower cases 71A and 71B, respectively.

A bobbin-type stator assembly 51 comprises six bobbins 53 on which coils 55 are wound. These bobbins 53 are formed in an annular-shape by a resin insulating material with an auxiliarly printed circuit board 57.

Each central portion of the auxiliarly printed circuit board 87 and the stator body 59 is provided with a penetrating hole 61. On one side of the stator body 59, an upper terminal 63A for electrically connecting this stator assembly to a control printed circuit board 87 depicted in FIG. 10 and a lower terminal 63B for electrically connecting this stator assembly to another stator assembly when a multiple structure is adapted are formed.

Since each of the bobbin coils 55 is not wound by a separate winder and a plastic bobbin 53 is used, a single or multiple axial winder which is easy to automatize can be used to wind the bobbin coils 55, thereby minimizing the manufacturing cost by reducing the expense for facility investment.

In addition, the coils for the bobbin coil 55 can be selected from a normal insulating copper wire which is chipper than the bonding wire used for the bobbinless coil by 25% to 50%, reducing the expense for the coil.

The stator assembly 51 is a single body, and the bobbin 53 is used for winding the bobbin coil 55, thereby enhancing the productivity and lowering the production costs, and reliable insulation is provided between the coils 55, which is of damp-proof and rust-proof structure.

When integrally forming the stator assembly by insert molding using the bobbinless stator coil, instead of the bobbin coil, the current flowing along the coil and the magnetic flux density become two times the single stator structure, thereby decreasing an air gap and increasing an output of the motor as much as two times those of the single stator.

The conventional motor employs a plurality of fan-shaped coils L depicted in FIG. 6, and 6 or 9 stator coils (L1 to L6), 6 transistors (TR1 to TR6), and 3 location sensors (H1 to H3) are used in the 3-phase drive manner as shown in FIGS. 4A and 4B.

According to the 2-phase drive manner 4, 8 or 12 stator coils (L1 to L8), 4, 6 or 8 transistors TR1 to TR8, and 2 location sensors (H1 and H2) are used.

The above is shown in Table 1.

|  | Number of Magnet poles | Number of Coils | Number of Transistors | Number of Sensors | Torque ripple |
|---|---|---|---|---|---|
| 3-phase | 4, 8, 12 | 6, 9 | 6 | 3 | Excellent |
| 2-phase | 6, 12, 18 | 4, 8, 12 | 4, 6, 8 | 2 | Good |

Referring to Table 1, the stator assembly is made by interconnecting terminals of 6 coils (L1 to L6), utilized (FIGS. 4 and 3) in the 3-phase drive manner, using an auxiliary printed circuit board (PCB), and 8 coils (L1 to L8) employed (FIG. 5) in the 2-phase drive manner. There is a need to solve the problems of a decrease of the productivity by preliminary connection of a plurality of coils and an increase of the production costs. The torque becomes high by increasing the number of the rotor's magnetic poles to obtain the maximum output of the motor of the same size, and simultaneously with this, the number of the coils must be increased.

In the conventional axial BLDC motor of FIG. 6 a conducting portion that produces the torque by the coil L acting with the magnet of the rotor (FIG. 2's 81A and 81B) during driving is parts LA and LC that are in parallel with a line radially stretching from the rotary shaft, and vertical intersections LB and LD are just necessary for maintenance of the coil L and indicative of a loss of the overall motor. The vertical intersections to which the torque of the rotor is not applied must be minimized in size. As a material of the coil a bonding wire that is 1.5 to 2 times as expensive as the ordinary insulating copper wire.

As shown in TABLE. 1, the 2-phase drive manner has a disadvantageous torque ripple aspect compared to the 3-phase drive manner, and a relatively large number of transistors. However, its drive circuit is economical and may be designed variously.

SUMMARY OF THE INVENTION

It is an object of the present invention to provide a BLDC motor having a built-in stator assembly having coils wound in a star shape and operated in 2-phase drive manner to prevent torque ripple in two phase and unnecessary loss of coil, and a method of manufacturing the same, thus lowering the overall production costs.

In order to achieve the above object, the present invention provides a stator assembly operated in a 2-phase drive manner including first and second stator coils wound in a star shape with a plurality of projections and a plurality of grooves, and arranged with a predetermined phase difference; and an annular supporting body into which the first and second stator coils are inserted for supporting the coils, insulating them from each other.

Each stator coil includes four projections and four grooves, and there is a phase difference $\theta$ between the first and second stator coils, the difference determined by the following equation: $\theta=360/2P\pm360/P$, wherein P denotes the number of a rotor's magnetic poles.

According to another aspect of the present invention, a brushless direct-current motor operated in a 2-phase drive manner including a stator consisting of first and second stator coils wound in a star shape with a plurality of projections and a plurality of grooves, and arranged with a predetermined phase difference; a shaft rotatably supported on a case; at least one disk-shaped multi-pole rotor supported by the shaft with an air gap from the stator in an axial direction; first and second location sensors provided to the stator with the same phase difference as that of the first and second stator coils for detecting the rotor's magnetic pole; and a driving control circuit driving the first and second stator coils in response to the detection of the magnetic pole of the rotor by the first and second location sensors, wherein said phase difference is determined by the equation: $\theta=360/2P\pm360/P$ (P=the number of a rotor's magnetic poles).

The first and second stator coils are fixedly inserted into an annular supporting body. The number of the rotor turning by the stator is two, and two rotors are axially disposed at both sides of the stator. The driving control circuit includes PNP-type first and third transistors each having a base to which a driving signal is applied in response to the detection of the rotor's magnetic pole; NPN-type second and fourth transistors each having a base to which a driving signal is applied in response to the detection of the rotor's magnetic pole, and a collector commonly connected to a colletor of each of the first and third transistors; and first and second capacitors connected in series between a common emitter of the first and third transistors and ground, wherein the first stator coil is connected between a node of the first and second capacitors and the common collector of the first and third transistors, and the second stator coil is connected between the node of the first and second capacitors and the common collector of the second and fourth transistors.

The driving control circuit includes a first group of four transistors for driving the first stator coil in response to the detection of the rotor's magnetic pole, and a second group of four transistors for driving the second stator coil in response to the detection of the rotor's magnetic pole. The BLDC motor further includes at least one stage of the stator and the rotor.

According to still another aspect of the present invention, a method of manufacturing a stator assembly operated in a 2-phase drive manner includes the steps of preliminarily winding an ordinary insulating coil in an annular shape with an ordinary winder and forming the coil into a star; forming a coil holder by the use of resin with star-shaped first and second grooves, each made on upper and lower portions, having a given phase difference according to the number of a rotor's magnetic poles; and fixedly inserting first and second coils into the first and second grooves and performing a resin olding to integrally form with the coil holder.

BRIEF DESCRIPTION OF THE DRAWINGS

A more complete appreciation of this invention, and many of the attendant of advantages thereof, will be readily apparent as the same becomes better understood by reference to the following detailed description when considered in conjunction with the accompanying drawings in which like reference numerals indicate the same or similar components, wherein.

DETAILED DESCRIPTION OF THE PREFERRED EMBODIMENT

Preferred embodiments will be now described with reference to the accompanying drawings.

Figure 7A:
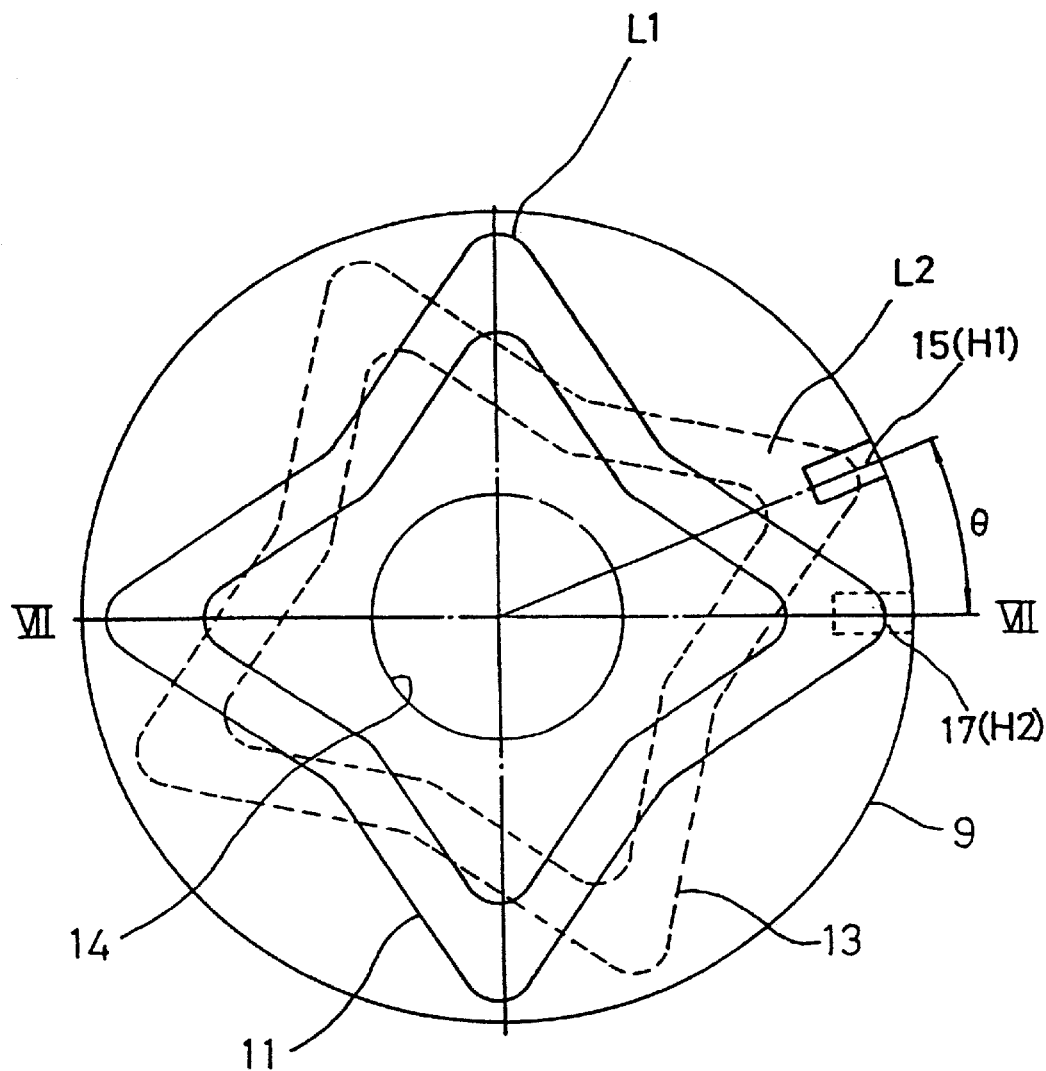
FIGS. 7A and 7B are each a plan view of a stator having coils wound in a star shape and driven in a 2-phase drive manner and a sectional view as taken along line VII to VII according to the present invention.
Figure 7B:
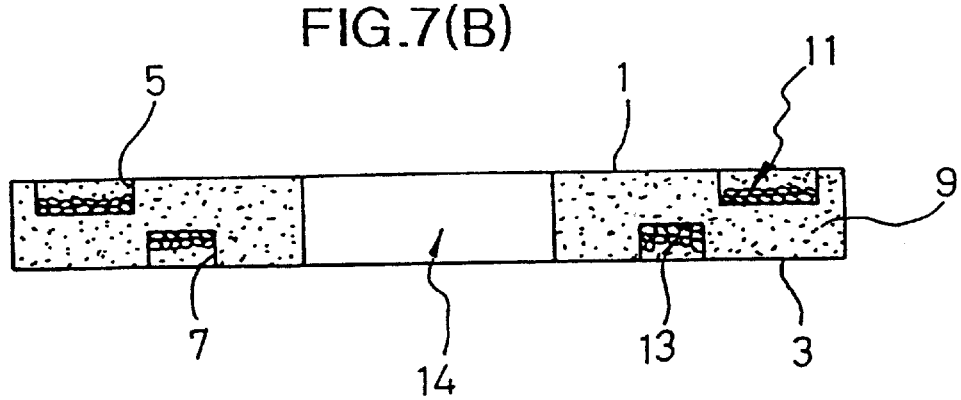

Referring first to FIG. 7, a 2-phase two-coil type stator includes star-shaped grooves 5 and 7 each provided to an upper portion 1 and a lower portion 3 of a coil holder 9, upper and lower coils L1, L2 11 and 13 wound in a star shape and each fixedly inserted into the grooves 5 and 7, and thorough hole 14 formed on its middle.

The upper and lower coils 11 and 13 are in the shape of a star having four projections and four grooves arranged at right angles with one another, and a phase difference θ between the upper and lower coils 11 and 13 is expressed by the following equation (1):

$$\theta = 360°/2P \pm 360°/P \qquad (1)$$

(wherein P denotes the number of magnetic poles)

Location sensors H1, H2, 15 and 17 for sensing the position of the rotor are arranged so that the same phase difference θ is created therebetween. A process of making the 2-coil built-in stator is described as follows.

First, an ordinary insulating coil is preliminarily wound in an annular shape with an ordinary winder, and the annularly wound coil is formed into a star, thus making a pair of stators 11 and 13. The star-shaped grooves 5 and 7, provided to the upper and lower portions 1 and 3, forms the coil holder 9 of resin having the phase difference θ determined by the above equation (1).

The coils 11 and 13 are inserted in the grooves 5 and 7, and then integrally formed with the coil holder 9 by epoxy molding or insert molding. A forming process may be omitted by inserting the annularly wound coils into the coil holder 9 with the grooves 5 and 7 without forming those coils into a star. The stator coils 11 and 13 each formed into a shape are made by insert molding without using the coil hold 9.

The following description concerns the operation of the stator of the present invention.

Figure 8:
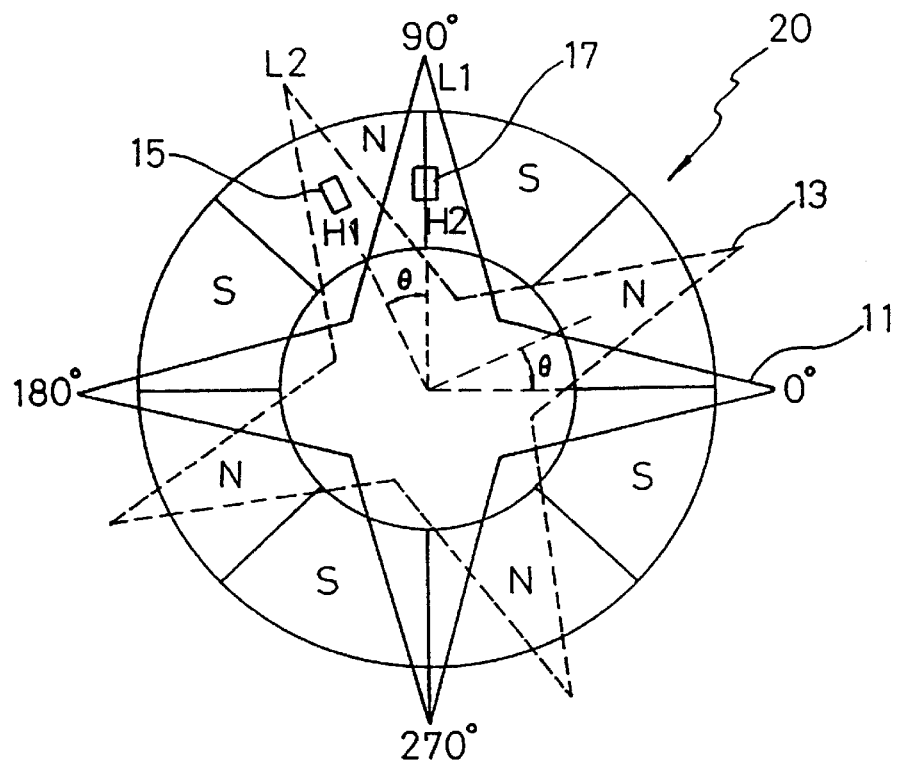
FIG. 8 depicts the arrangement of an 8-pole rotor and a stator coil.
Figure 9:
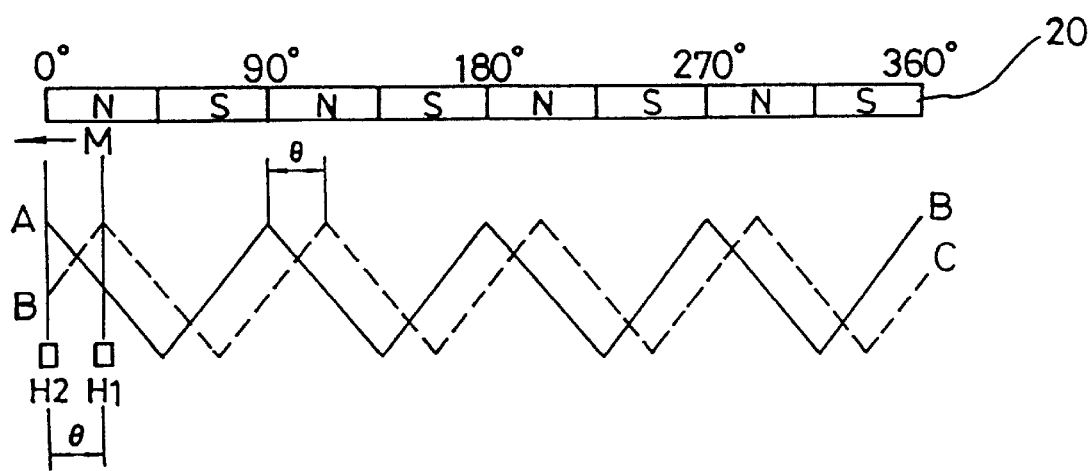
FIG. 9 is a development view of the stator coil and the 8-pole magnet of FIG. 8.
Figure 12:
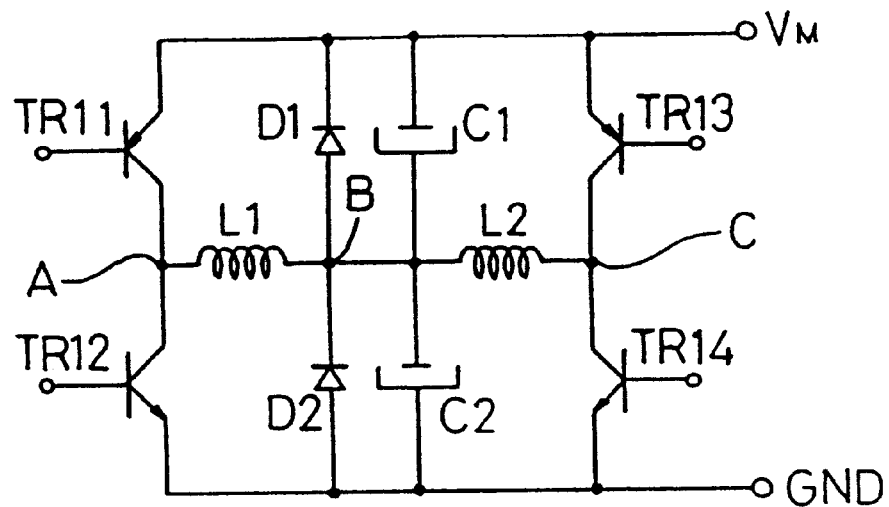
FIG. 12 depicts a 4-transistor driving circuit for a 2-phase & 2-coil stator assembly in accordance with the present invention.

FIG. 8 illustrates the arrangement of an 8-pole rotor and a stator coil, and FIG. 9 is a development view of the stator coil and the 8-pole magnet of FIG. 8. FIG. 12 depicts a 4-transistor driving circuit for a 2-phase & 2-coil stator assembly in accordance with the present invention.

Referring to FIG. 8, the stator coils 11 and 13 are coupled with an 8-pole rotor 20, and the phase difference θ between the stator coils 11 and 13 may be ±22.5° or ±67.5° according to the equation (1). In this preferred embodiment, the phase difference θ equals 22.5° by way of example. Similarly, the phase difference θ between the location sensors H1, H2, 15 and 17 is set to 22.5°.

As shown in FIG. 12, the driving circuit for the stator may include four transistors TR11 to TR14 with a single power supply Vm. One terminal of each of stator coils L1 and L2 is connected between a common collector A of the first and second transistors TR11 and TR12 and a common collector C of the third and fourth transistors TR13 and TR14. Capacitors C1 and C2 and diodes D1 and D2 are each connected between a node B of the coils L1 and L2 and power supply Vm and the node B and ground.

The following table 2 relates to the driving conditions where making an electric motor with the 8-pole rotor, 2-phase/2-coil stator, and four transistors.

TABLE 2

| Angle | 0° | 22.5° | 45° | 67.5° | 90° |
|---|---|---|---|---|---|
| H1 | N | . | S | . | N |
| H2 | . | N | . | S | . |
| L1 | B→A | . | A→B | . | B→A |
| L2 | . | B→C | . | C→B | . |
| TR | TR12 | TR14 | TR11 | TR13 | TR12 |

If the transistor driving conditions are set as shown in the table 2, e.g. in case of 0°, the location sensor H1 detects N pole, and the location sensor H2, interposed between the magnetic poles, does not detect any pole.

In order that the rotor 20 receives torque in one way, e.g. in a left direction M, if the location sensors H1 and H2 detect N pole, the electric current flows across the coil L1 from the node B to the node C, and current flows across the coil L2 from the node B to the node C. On the contrary, if the location sensors H1 and H2 detect S pole, the electric current flowing across each of the coils L1 and L2 is in the opposite direction to the above.

A logic circuit (not shown) is interposed between the location sensors H1 and H2 and bases of transistors TR11 to TR14, thus turning ON the transistors.

When the location sensor H1 detects N pole, a control signal is applied so as to turn ON the transistor TR12 only, and the current created when discharging the capacitor C2 flows to ground via the coil L1 and the transistor TR12. In case that the rotor rotates by 22.5°, the location sensor H2 detects N pole, and the transistor TR14 is turned ON, so that the electric current flows across the coil L2 in the direction as shown in the table 2. As the location sensors H1 and H2 detect the magnetic pole of the rotor, the direction of the electric current flowing to the respective coils L1 and L2 is determined.

If there is a change in the direction of the electric current flowing across the respective stator coils L1 and L2 in response to the detection of the rotor 20's magnetic pole, magnetic force is applied to the rotor according to Flemming's left-hand rule, and the rotor 20 is moved by the torque produced in the left direction.

The straight conducting part of each of the stator coils 11 and 13, intersecting the magnetic flux generating the torque of the rotor 20, is substantially the same as the conventional fan-shaped bobbinless coil's, and the curved part necessary for keeping the shape of the coils is reduced to about ⅓ compared to the conventional art. In the star-wound stator, the stator coil is manufactured by an ordinary winder using an inexpensive ordinary wire, and the coils are each inserted to both sides of the coil holder 9 made of resin with the anti-vibration, damp-proof and insulating features, using the two winding coils. It facilitates the coiling and coil connection and enhances the productivity.

The stator is driven by the four transistors, and the cost saving can be assured compared to 8-transistor driving manner. The star-wound motor has four triangular shaped coils, and the size of the torque ripple is relatively small compared to the motor using the fan-shaped coil.

Figure 10:
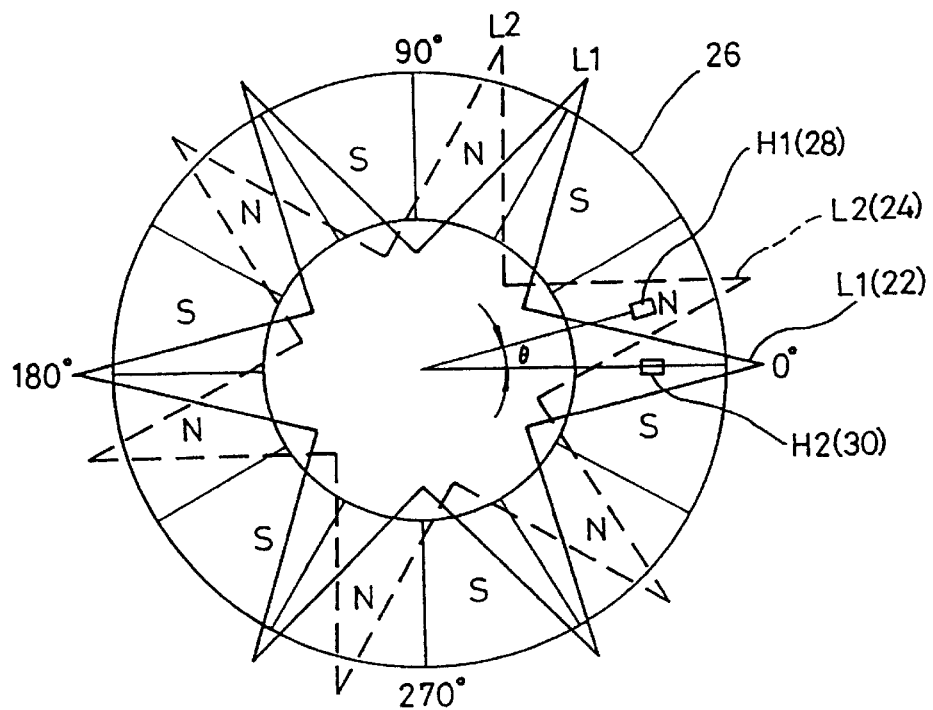
FIG. 10 depicts the arrangement of a 12-pole rotor and a stator coil.
Figure 11:
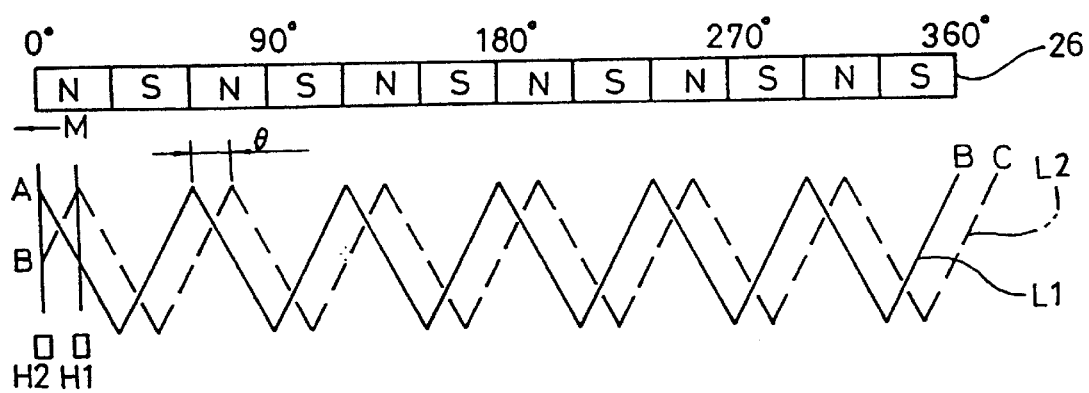
FIG. 11 is a development view of the stator coil and 12-pole magnet of FIG. 10.

Referring to FIGS. 10 and 11, FIG. 10 is the arrangement of a 12-pole rotor and a stator coil. FIG. 11 is a development view of the 6-angle stator coil and 12-pole magnet of FIG. 10 for describing the rotor's rotation when forming the BLDC motor with the inventive stator and 12-pole rotor.

The stator coils 22 and 24 of FIG. 10 are coupled with the 12-pole rotor 26, and the phase difference θ between the stator coils 22 and 24 may be ±15°, ±45° or ±75° according to the equation (1). In this preferred embodiment, the phase difference θ equals 15° by way of example. Similarly, the phase difference θ between the location sensors H1, H2, 28 and 30 is set to 15°.

As shown in FIG. 12, the driving circuit for the stator may include four transistors TR11 to TR14 with a single power supply Vm. One terminal of each of stator coils L1 and L2 is connected in series between a common collector A of the first and second transistors TR11 and TR12 and a common collector C of the third and fourth transistors TR13 and TR14, and capacitors C1 and C2 are each connected between a node B of the coils L1 and L2 and power supply Vm and ground. Diodes D1 and D2, connected between an emitter and a collector of the transistors TR11 to TR14, are used for protecting the transistors.

The following table 3 relates to the driving conditions where making an electric motor with the 12-pole rotor, 2-phase/2-coil stator, and four transistors.

TABLE 3

| Angle | 0° | 15° | 30° | 45° | 60° | 75° | 90° |
|---|---|---|---|---|---|---|---|
| H1 | N | . | S | . | N | . | S |
| H2 | . | N | . | S | . | N | . |
| L1 | B→A | . | A→B | . | B→A | . | A→B |
| L2 | . | C→B | . | B→C | . | C→B | . |
| TR | TR12 | TR13 | TR11 | TR14 | TR12 | TR13 | TR11 |

If the transistor driving conditions are set as shown in the table 3, e.g. in case of 0°, the location sensor H1 detects N pole, and the location sensor H2, interposed between the magnetic poles, does not detect any pole.

If the location sensors H1 and H2 detect N pole since the phase difference of the coil and the location sensor is 15° in order that the rotor 26 receives torque in one way, e.g. in a left direction M, the electric current flows across the coil L1 from the node B to the node A, and current flows across the coil L2 from the node C to the node B. On the contrary, if the location sensors H1 and H2 detect S pole, the electric current flowing across each of the coils L1 and L2 is in the opposite direction to the above.

When the location sensor H1 detects N pole, a control signal is applied so as to turn ON the transistor TR12 only, and the electric current created when discharging the capacitor C2 flows to ground via the coil L1 and the transistor TR12. In case that the rotor rotates by 7.5°, the location sensor H2 detects N pole, and the transistors TR12 and TR13 are turned ON, so that the electric current flows across the coil L2 in the direction as shown in the table 3. As the location sensors H1 and H2 detect the magnetic pole of the rotor, the direction of the electric current flowing to the respective coils L1 and L2 is determined.

If there is a change in the direction of the electric current flowing across the respective stator coils L1 and L2 according to the detection of the rotor 26's magnetic pole, the rotor 26 is moved by the torque produced in the left direction.

The structure of the rotor to be combined with the stator coil may be variously designed compared to the 2-phase drive manner limiting to 6-pole & 4-coil, 12-pole & 8-coil, 18-pole & 12-coil to meet the equation (1).

Figure 13:
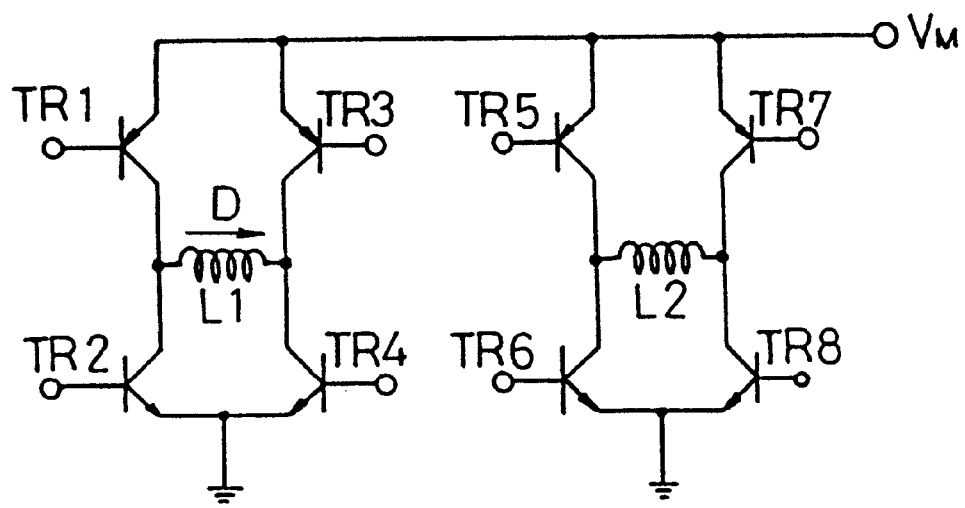
FIG. 13 depicts a 8-transistor driving circuit for a 2-phase & 2-coil stator in accordance with the present invention.

The stator coils L1 and L2 may be driven by the use of 8 transistors in the well-known manner as shown in FIG. 13. Each pair of four transistors TR1 to TR4 for driving the stator coil L1 and four transistors TR5 to TR8 for driving the stator coil L2 is turned ON in a manner that the direction of the electric current flowing across the coils L1 and L2 can be controlled. For example, if the transistors TR1 and TR4 are selectively driven, the current flows in the direction D of the coil L1.

Figure 1:
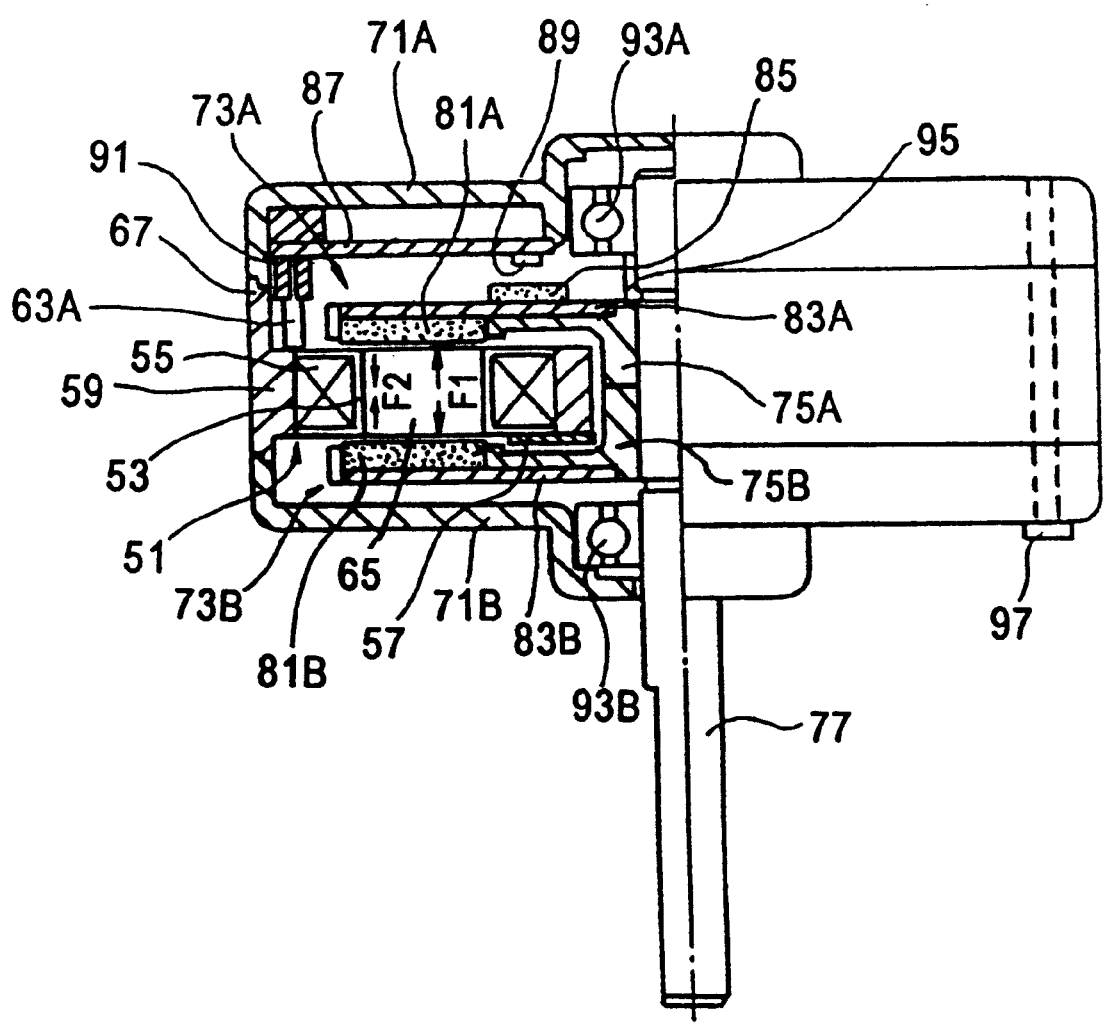
FIG. 1 is an axial-sectional view showing a coreless BLDC motor of a double-rotor/single-stator type using a conventional stator.
Figure 2:
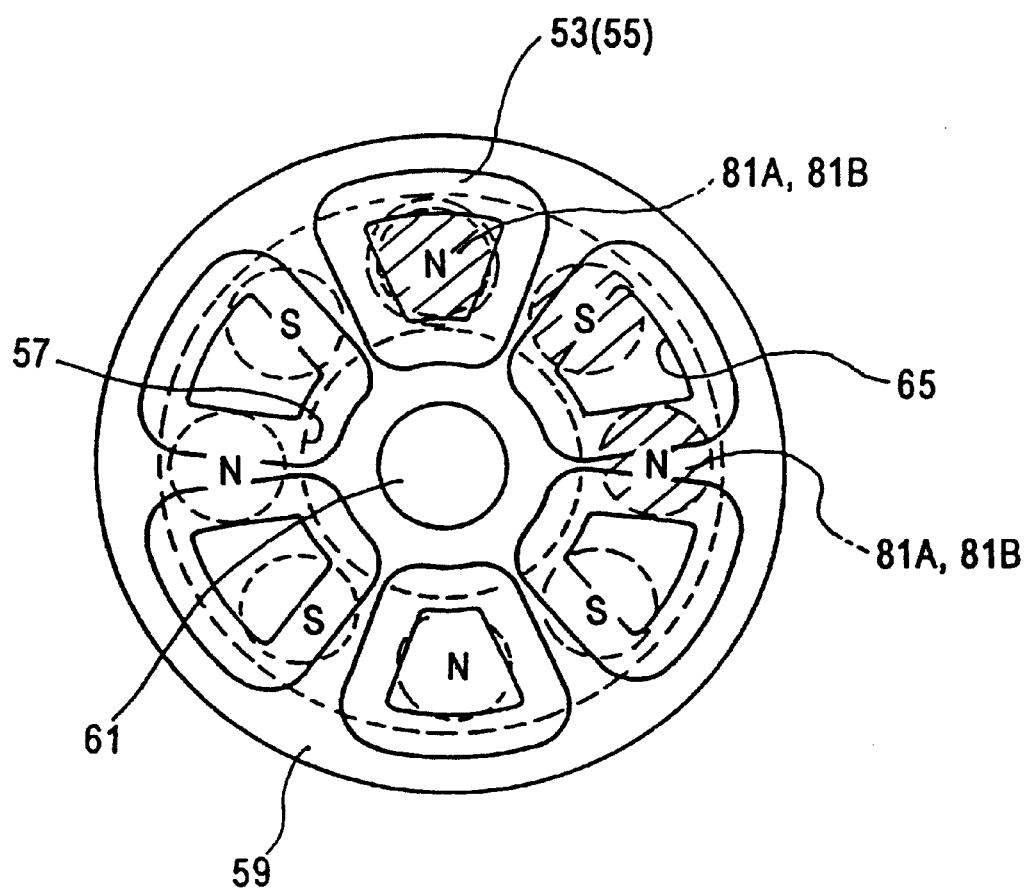
FIG. 2 depicts the arrangement of a stator coil and a rotor magnet as shown in FIG. 1.
Figure 3A:
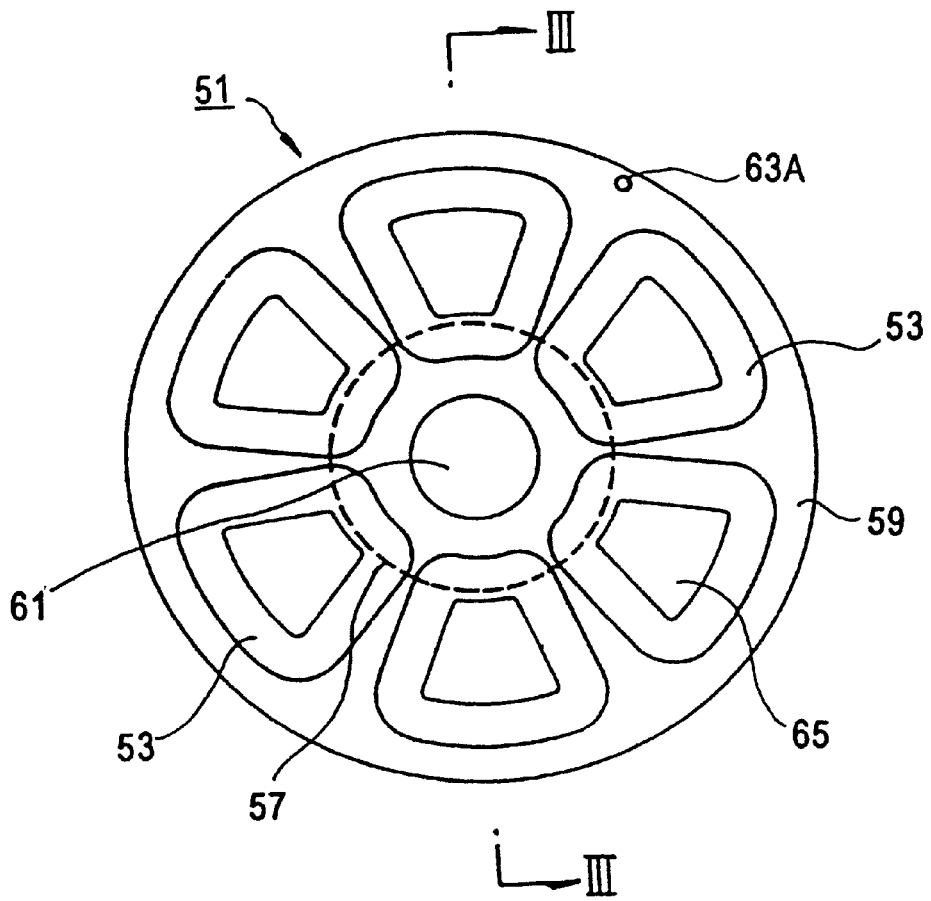
FIGS. 3A and 3B are each a plan view of a stator of FIG. 1 and a sectional view as taken along line III—III.
Figure 3B:
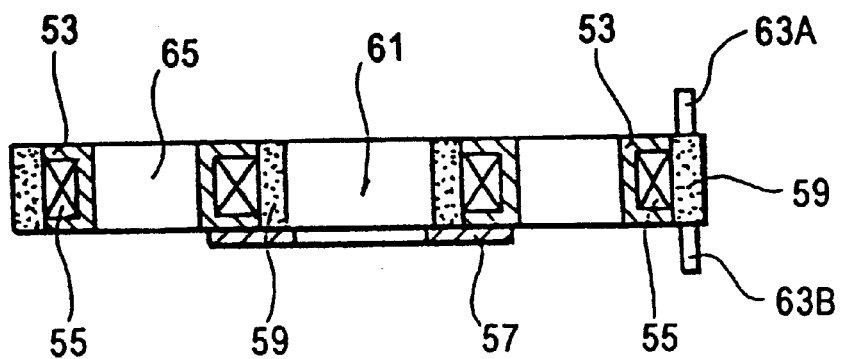
Figure 4A:
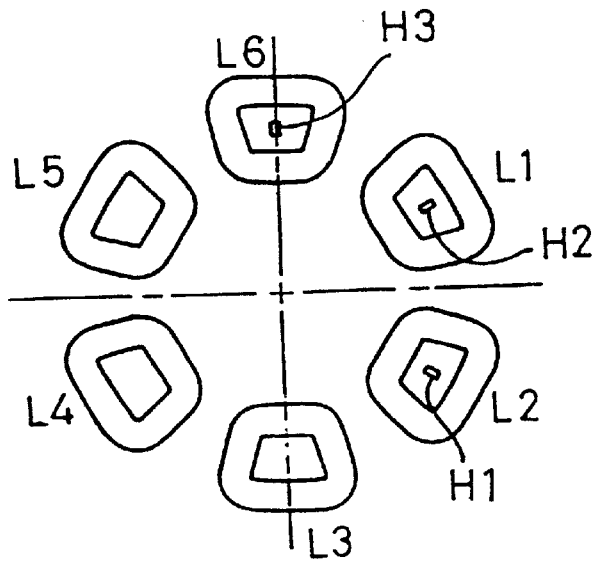
FIGS. 4A and 4B depict a stator coil driven in a 3-phase drive manner and a drive circuit, respectively.
Figure 4B:
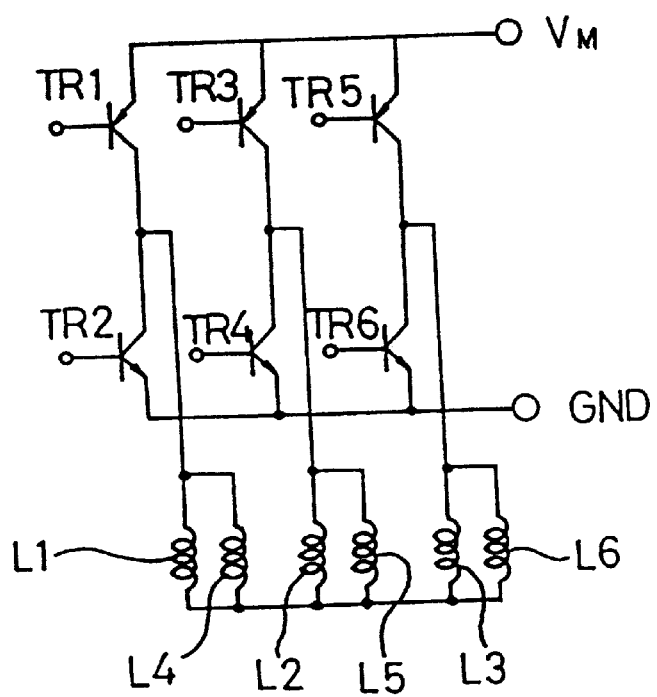
Figure 5A:
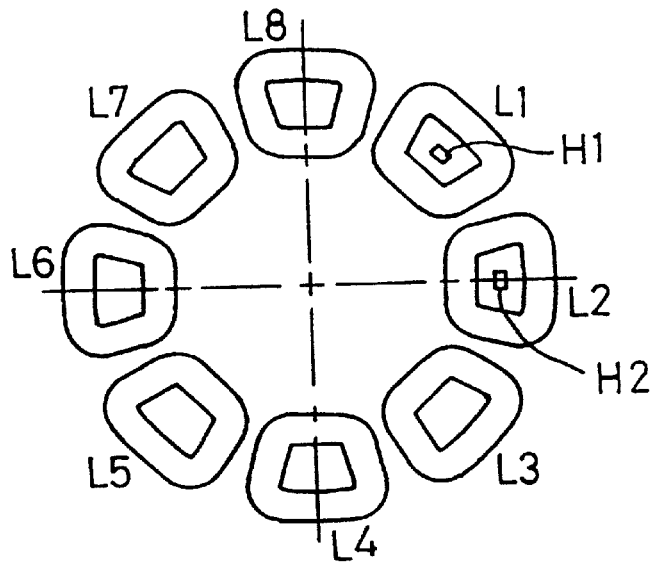
FIGS. 5A and 5B depict a stator coil driven in a 2-phase drive manner and its driving circuit, respectively.
Figure 5B:
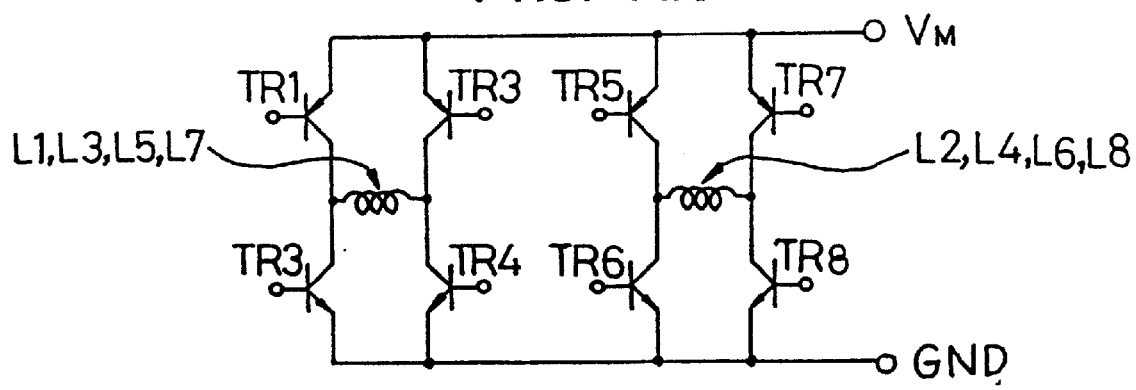
Figure 6:
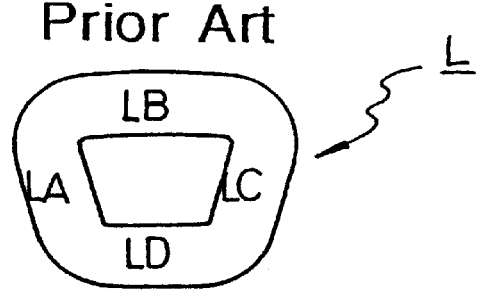
FIG. 6 is an enlarged view of the stator coil of FIG. 5.

The above description is made on the single-rotor/stator BLDC motor by way of example, and a double rotor/single stator BLDC motor of FIG. 1 is also applicable. The above preferred embodiment has been described using the rotor of a pole dividing multi-polarity arrangement structure as an example, and the present invention is not limited thereto and a magnet dividing multi-polarity arrangement structure is also available.

In addition, the above preferred embodiment was described about the 2-phase & 2-coil stator by way of example, and a 3-phase & 3-coil stator of star-winding mechanism can be formed by those who skilled in the art. That is, such a structure can be realized by forming a coil wound in a star shape integrally with the rotor of the above preferred embodiment via insert molding to have a phase difference from two coils.

In the above description, each stator coil is in a star shape with four or six projections, and a star-shaped stator coil with three projections may be formed by those skilled in the art.

As described above, the stator assembly operated in the 2-phase drive manner has upper and lower coils wound in a star shape and arranged with a predetermined phase difference to be integrally formed, thus minimizing a loss of coil and torque ripple. The coil is made of an ordinary insulating wire, and may be wound and formed with an ordinary winder thereby lowering the overall production costs. In addition, the present invention does not require any facility investment on the new winding mechanism, and the inventive simple structure significantly enhances the productivity.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A stator coils assembly operated in a 2-phase drive manner comprising:

first and second stator coils wound in a star shape with a plurality of projections and a plurality of grooves, and arranged with a predetermined phase difference; and an annular supporting body into which the first and second stator coils are inserted for supporting the coils, insulating them from each other wherein each stator coil includes four projections and four grooves, and there is a phase difference θ between the first and second stator coils, the difference determined by the following equation:

$$\theta = 360°/2P \pm 360°/P,$$

wherein P denotes the number of a rotor's magnetic poles.

2. A stator assembly operated in a 2-phase drive manner according to claim 1, wherein the stator assembly is used for an axial-type brushless direct-current motor.

3. A brushless direct-current motor operated in a 2-phase drive manner comprising:

a stator consisting of first and second stator coils wound in a star shape with a plurality of projections and a plurality of grooves, and arranged with a predetermined phase difference;

a shaft rotatably supported on a case;

at least one disk-shaped multi-pole rotor supported by the shaft with an air gap from the stator in an axial direction;

first and second location sensing means provided to the stator with the same phase difference as that of the first and second stator coils for detecting the rotor's magnetic pole; and driving control means driving the first and second stator coils in response to the detection of the magnetic pole of the rotor by the first and second location sensing means, wherein said phase difference is determined by the equation:

$$\theta = 360°/2P \pm 360°/P$$

(P=the number of a rotor's magnetic poles).

4. A brushless direct-current motor according to claim 3, wherein the first and second stator coils are fixedly inserted into an annular supporting body.

5. A brushless direct-current motor according to claim 3, wherein the number of the rotor turning by the stator is two, and two rotors are axially disposed at both sides of the stator.

6. A brushless direct-current motor according to claim 3, wherein the driving control means includes:

PNP-type first and third transistors each having a base to which a driving signal is applied in response to the detection of the rotor's magnetic pole;

NPN-type second and fourth transistors each having a base to which a driving signal is applied in response to the detection of the rotor's magnetic pole, and a collector commonly connected to a colletor of each of the first and third transistors; and first and second capacitors connected in series between a common emitter of the first and third transistors and ground, wherein the first stator coil is connected between a node of the first and second capacitors and the common collector of the first and third transistors, and the second stator coil is connected between the node of the first and second capacitors and the common collector of the second and fourth transistors.

7. A brushless direct-current motor according to claim 3, wherein the driving control means includes:

a first group of four transistors for driving the first stator coil in response to the detection of the rotor's magnetic pole; and a second group of four transistors for driving the second stator coil in response to the detection of the rotor's magnetic pole.

8. A brushless direct-current motor according to claim 3, further comprising at least one stage of said stator and said rotor according to the axial direction of the shaft.

* * * * *